United States Patent [19]
Green

[11] Patent Number: 5,526,952
[45] Date of Patent: Jun. 18, 1996

[54] PROTECTIVE COVERS FOR ELECTRICAL OUTLET BOXES

[76] Inventor: Robert L. Green, 4775 Highland Dr., Post Falls, Id. 83854

[21] Appl. No.: 406,538

[22] Filed: Mar. 20, 1995

[51] Int. Cl.⁶ ........................................ H02G 3/12
[52] U.S. Cl. ................................. 220/3.8; 220/241
[58] Field of Search ........................... 220/3.4, 3.8, 241, 220/212; 33/528, 562, DIG. 10

[56] References Cited

U.S. PATENT DOCUMENTS

| | | | |
|---|---|---|---|
| 2,573,260 | 10/1951 | Gorman | 220/3.4 |
| 2,666,546 | 1/1954 | Reilly | 220/3.4 |
| 2,791,345 | 5/1957 | Troutman | 220/3.4 |
| 2,898,688 | 8/1959 | Cottar | 220/3.4 |
| 3,015,408 | 1/1962 | Campbell et al. | 220/3.4 |
| 3,601,276 | 8/1971 | Culpepper | 220/3.8 |
| 3,619,477 | 11/1971 | Rasmussen | 174/66 |
| 3,745,664 | 7/1973 | Altseimer | 220/3.8 |
| 4,359,619 | 11/1982 | Bergoltz | 220/333 |
| 4,589,211 | 5/1986 | Policka | 33/562 |
| 4,802,284 | 2/1989 | Jackson | 33/562 |
| 4,907,711 | 3/1990 | Stuchlik | 220/3.8 |
| 4,953,733 | 9/1990 | Loscuito | 220/3.4 |

Primary Examiner—Stephen J. Castellano

[57] ABSTRACT

A temporary protective cover for electrical outlet boxes and the like which prevents the boxes from being covered with wall material during installation, prevents paint and plaster from entering the boxes during finishing operations, and also prevents electrical shock from contact with exposed wires. The cover is molded in one piece and is constructed of polymeric material. The cover is universally dimensioned to cover the box openings of all conventionally sized boxes and includes a base member for encasing electrical elements positioned in and extending outwardly from the boxes. A plurality of retaining members frictionally secure the cover over the box openings. A plurality of projections extend from the cover to indicate the location of the box openings, to mark the periphery thereof on drywall for subsequent cutting, and to prevent wire damage during cutting. A plurality of holes are also provided in the cover for receiving fasteners to provide further securement of the cover over the openings.

20 Claims, 4 Drawing Sheets

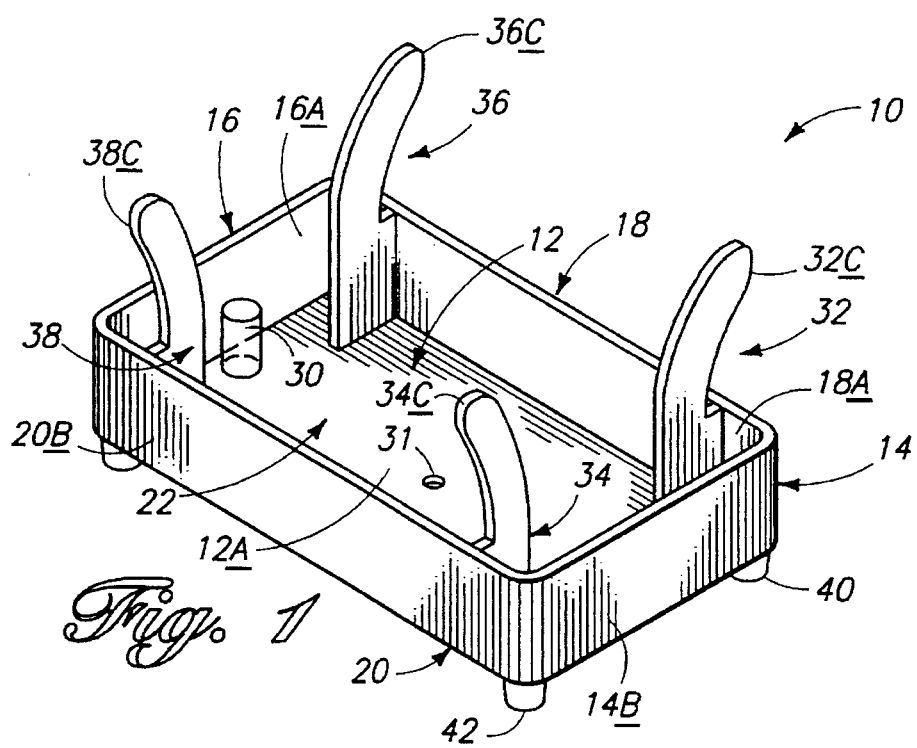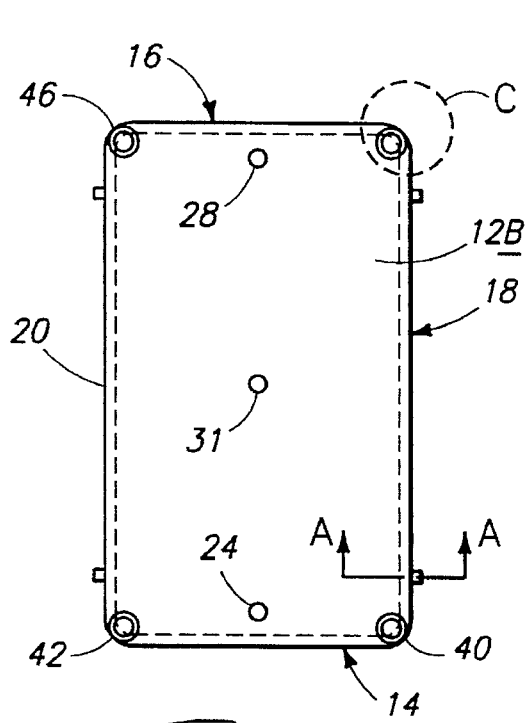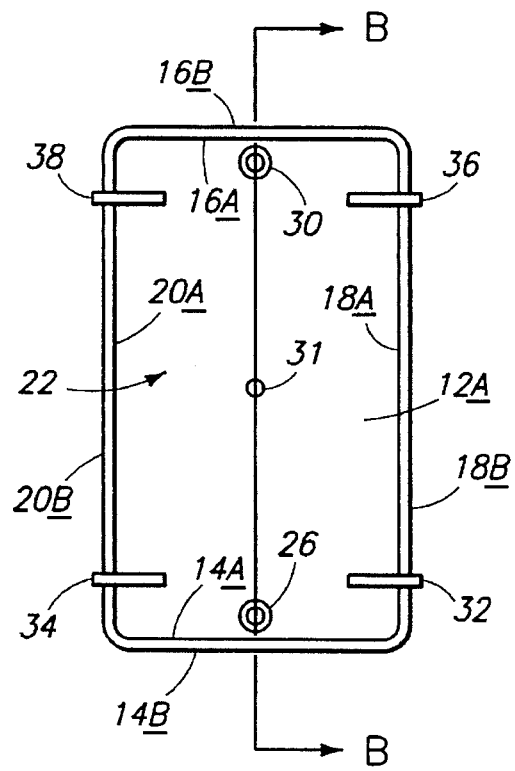

PROTECTIVE COVERS FOR ELECTRICAL OUTLET BOXES

BACKGROUND OF THE INVENTION

1. Field of the Invention

The field of the invention relates to protective covers for openings, and more particularly to temporary protective covers for electrical outlet boxes.

2. Description of the Prior Art

A wide variety of techniques have been used to protect electrical outlet boxes during construction of new buildings as well as in remodeling of existing buildings. For example, permanent cover plates have been removed and the box openings, outlets, switches, and wires therein covered with tape. Alternatively, the permanent cover plates, outlets, and switches have all been removed prior to taping the box openings. However, these techniques increase the likelihood of construction materials such as paint, plaster and joint compound entering and contaminating the boxes, and also create a dangerous potential for electrical shock by exposure to and contact with the wires inside the boxes.

Further, various prior art devices have been employed to temporarily protect electrical outlet boxes such as indicated in U.S. Pat. No. 2,971,345 to Troutman which discloses an outlet box cover which is secured to the box using a plurality of pins. The cover has a central cavity containing a rubber inlay and a locating pin therein which is used to remove the cover after plastering over the cover and the wall.

U.S. Pat. No. 3,015,408 to Campbell shows another outlet box cover which is molded in one piece and constructed of polymeric material. The cover is dome-shaped and secured to the box with pins or prongs. A locating pin extending from one side of the cover is used to remove the cover from the box after plastering over the cover and the wall.

U.S. Pat. No. 3,601,276 to Culpepper illustrates still another removable outlet box cover which is secured to the box with a plurality of upper and lower bendable tabs. The center panel of the cover is provided with a plurality of bendable flaps to permit visual inspection of the electrical wires in the box, and to also provide a barrier for preventing plaster from entering the box.

U.S. Pat. No. 3,619,477 to Rasmussen sets forth yet another removable outlet box cover which is secured to the box with a pair of upper and lower ribbed studs pressed into holes in the box, as well as screws mounted in holes provided in the base plate and threaded into receiving apertures in the box. The base plate of the cover is molded in one piece and is constructed of semi-resilient polymeric material.

U.S. Pat. No. 4,359,619 to Bergoltz discloses a further removable cover for an electrical box-type receptacle which includes a flanged base plate having a pair of upstanding affixing spikes or pins extending from the base plate. The cover is mounted to the receptacle by pressing the spikes into aligned sockets provided in the receptacle.

U.S. Pat. No. 4,907,711 to Stuchlik discloses yet another protective cover for an electrical outlet box comprising a planar base plate and a plurality of upstanding material-marking projections extending outwardly from the base plate in one direction. Further, a pair of resilient legs extend outwardly from each end of the base plate in a direction opposite to the marking projections. The resilient legs are arranged to frictionally contact interior end surfaces of the box to secure the cover over the box opening.

As such, it may be appreciated, in view of the practices and devices of the prior art, that there continues to be a need for a new and improved protective cover for electrical outlet boxes which addresses both the problems of ease of use, portability, and effectiveness in construction, and in this respect, the present invention fulfills this need.

SUMMARY OF THE INVENTION

In view of the foregoing disadvantages inherent in the known types of protective covers for electrical outlet boxes now present in the prior art, the present invention provides a temporary cover which effectively covers the box opening and thereby protects electrical elements contained in and extending outwardly from the boxes during the construction processes of painting, plastering, drywall installation, and the like. As such, the general purpose of the present invention, which will be described subsequently in greater detail, is to provide a new and improved protective cover for electrical outlet boxes which has all the advantages of the protective covers of the prior art and none of the disadvantages.

To attain this, the present invention includes a protective cover for electrical outlet boxes and the like which prevents the boxes from being covered during drywall installation, prevents paint and plaster from entering the boxes during finishing operations, and also prevents electrical shock from contact with exposed wires. The cover is molded in one piece and is constructed of polymeric material. The cover is universally dimensioned to cover the box openings of all conventionally sized boxes, and includes a base member for encasing electrical elements positioned in and extending outwardly from the boxes. A plurality of retaining members frictionally secure the cover over the box openings. A plurality of projections extend from the cover to indicate the location of the box openings, to mark the periphery thereof on drywall for subsequent cutting, and to prevent wire damage during cutting. A plurality of holes are also provided in the cover for receiving fasteners to provide further securement of the covers over the openings.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the included abstract is to enable the U.S. Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

It is therefore an object of the invention to provide a new and improved protective cover for electrical outlet boxes which has all the advantages of the prior art protective covers and none of the disadvantages.

It is another object of the present invention to provide a new and improved protective cover for electrical outlet boxes which may be easily and efficiently manufactured and marketed.

It is a further object of the present invention to provide a new and improved protective cover for electrical outlet boxes which is of durable and reliable construction.

An even further object of the present invention is to provide a new and improved protective cover for electrical outlet boxes which is susceptible of a low cost of manufacture with regard to both materials and labor, and which accordingly is then susceptible of low prices of sale to the consuming public, thereby making such protective covers economically available to the buying public.

Still yet another object of the present invention is to provide a new and improved protective cover for electrical outlet boxes which provides in the apparatuses and methods of the prior art some of the advantages thereof, while simultaneously overcoming some of the disadvantages normally associated therewith.

Still another object of the present invention is to provide new and improved protective covers for electrical outlet boxes which are each universally dimensioned to be secured in each conventionally employed single and multiple gang outlet box, thus eliminating the more costly requirement of providing a multiplicity of different sized covers for each of the variously sized single and multiple gang outlet boxes used in new construction and/or remodeling operations.

Yet another object of the present invention is to provide a new and improved protective cover for electrical outlet boxes which is easily removed from the boxes, reusable, and composed of recyclable polymeric material to thereby reduce construction costs as well as to protect the environment.

Even still another object of the present invention is to provide a new and improved protective cover for electrical outlet boxes for use in new construction wherein the cover effectively prevents the entry of paint, plaster, joint compound, or other construction debris into the boxes and thereby avoids any damage to the electrical wires therein, and further eliminates any subsequent, time-consuming cleaning and repairing operations caused by entry of such debris into the boxes which would increase construction costs.

Another object of the present invention is to provide a new and improved protective cover for electrical outlet boxes for use during wall painting operations wherein the cover protects electrical recepticles and switches housed in and extending from the boxes from being covered with paint, and further prevents electrical shock from contact with exposed wires connected to the recepticles and switches.

Another object of the present invention is to provide a protective cover for electrical outlet boxes which prevents the boxes from being covered by drywall or similar wall covering, effectively locates and marks the position of the boxes on the drywall, shields the electrical wires therein from damage during drywall cutting operations, and further prevents contact with the wires to eliminate any electrical shock therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the protective cover for electrical outlet boxes of the present invention.

FIG. 2 is a bottom plan view of the protective cover of the present invention.

FIG. 3 is a top plan view of the protective cover of the present invention.

DESCRIPTION OF THE PREFERRED EMBODIMENT

Figure 4:
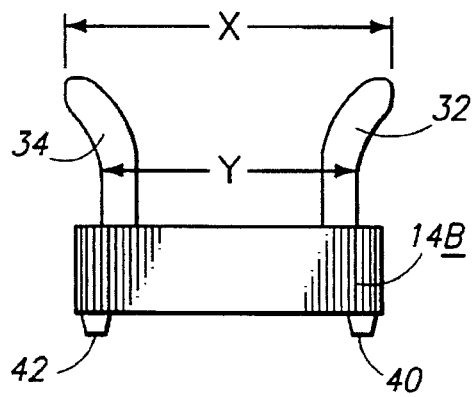
FIG. 4 is an end elevational view of the protective cover of the present invention.
Figure 5:
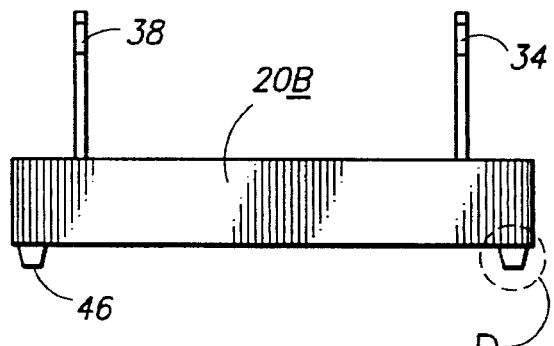
FIG. 5 is a side elevational view of the protective cover of the present invention.
Figure 6:
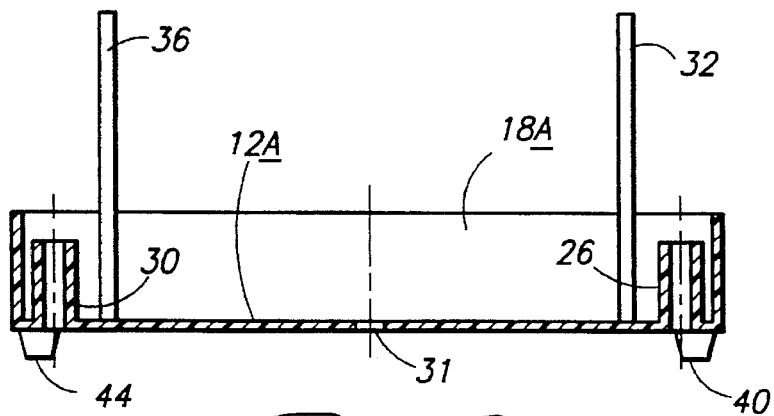
FIG. 6 is a cross-sectional view of the protective cover of the present invention taken along line B—B in FIG. 3.
Figure 7:
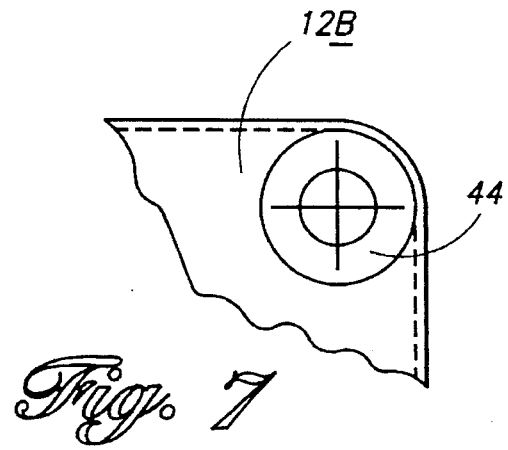
FIG. 7 is an enlarged bottom plan view of that portion of the protective cover of the present invention lying within circle C in FIG. 2.
Figure 8:
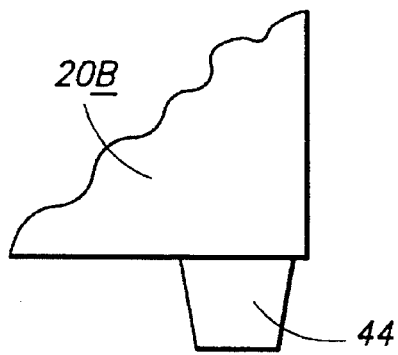
FIG. 8 is an enlarged side elevational view of that portion of the protective cover of the present invention lying within circle D in FIG. 5.

With reference now to the drawings, and in particular to FIGS. 1–13, new and improved protective covers for electrical outlet boxes embodying the principles and concepts of the present invention and generally designated by the reference numerals 10, 47,55 will be described.

More specifically, and referring particularly to FIGS. 1–8, the illustrated single gang protective cover 10 is molded in one piece and constructed of either virgin or recycled polymeric material having a thickness of approximately 0.065" to provide a cover 10 having sufficient strength, rigidity, and flexibility. The preferred polymeric material is polyethylene due to its high degree of resiliency which facilitates both insertion and removal of the cover. Furthermore, polyethylene is recyclable and construction materials such as paint, plaster, and joint compound do not readily adhere to it, thus enabling easy cleaning for reuse. Cover 10 includes a base plate 12 having an inner surface 12A and an outer surface 12B. Extending upwardly and integrally from inner surface 12A is an end wall 14 having an inner surface 14A and an outer surface 14B. An end wall 16 extends upwardly and integrally from inner surface 12A and includes an inner surface 16A and an outer surface 16B. Extending upwardly and integrally from inner surface 12A is a side wall 18 having an inner surface 18A and an outer surface 18B. A side wall 20 extends upwardly and integrally form inner surface 12A and includes an inner surface 20A and an outer surface 20B. End walls 14,16 and side walls 18,20 are joined at their respective ends to form, together with base plate 12, a base member 22.

Positioned on the central axis of cover 10 in a location near inner surface 14A is a hole 24 extending through base plate 12 for receiving a cover-mounting fastener (not shown). Extending integrally and outwardly from inner surface 12A and surrounding hole 24 is a guide boss 26 for receiving and aligning a mounting fastener with a mounting hole in an electrical outlet box. Positioned on the central axis of cover 10 in a location near inner surface 16A is a hole 28 extending through base plate 12 for receiving another cover-mounting fastener (not shown). Extending integrally and outwardly from inner surface 12A and surrounding hole 28 is a guide boss 30 for receiving and aligning another mounting fastener with another mounting hole in the electrical outlet box. Positioned approximately at the center of cover 10 is a hole 31 extending through base plate 12 for receiving still another cover-mounting fastener for engagement with a further hole in the electrical outlet box.

Figure 10:
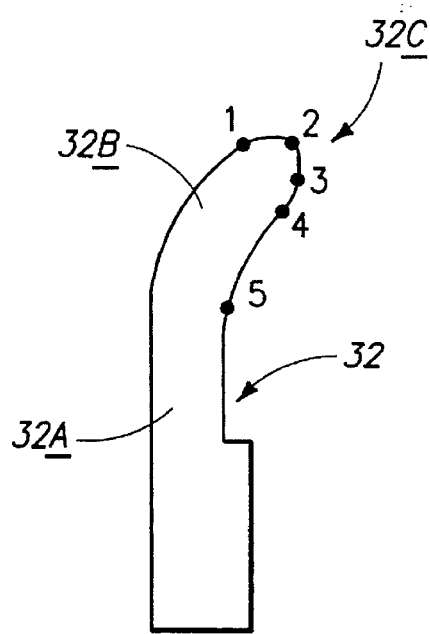
FIG. 10 is an end elevational view of one of the resilient legs of the protective cover of the present invention.
Figure 9:
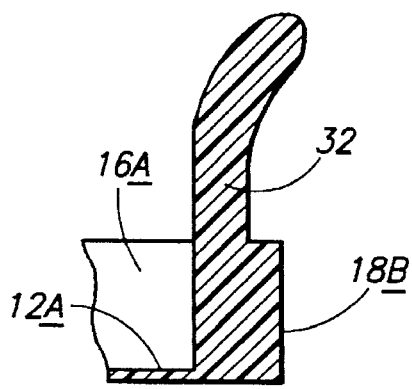
FIG. 9 is a cross-sectional view of the protective cover of the present invention taken along line A—A in FIG. 2.

With particular reference to FIGS. 1–4, 9 and 10, the structure for frictionally securing cover 10 in the outlet boxes is illustrated, i.e. resilient legs 32,34,36, and 38. Legs 32 and 36 extend integrally and upwardly from inner surfaces 12A and 18A, while legs 34 and 38 extend integrally and upwardly from inner surfaces 12A and 20A to positions at outer ends 32C,34C,36C,38C which lie outwardly and laterally beyond enclosure 22 to enable frictional contact of outer ends 32C,34C,36C,38C with interior surfaces of the boxes upon insertion of the legs into the boxes. Legs 32,34,36,38 are structurally identical. An exemplary construction for the legs is shown in FIGS. 9 and 10 with reference to leg 32 which has a substantially straight lower portion 32A and an upper portion 32B which extends integrally upwardly and outwardly from portion 32A to outer end 32C. Outer end 32C comprises a outwardly curved first portion extending between points 1–2 as shown in FIG. 10. Extending between points 2–3 is a linear second portion. A substantially linear third portion extends between points 3–5 and is provided with a slightly curved forward end between points 3–4.

Disposed on and extending integrally and outwardly from each corner of outer surface 12B are frusto-conical projections 40,42,44, and 46 (see FIGS. 1,2, and 4–8), respectively, which function to indicate and mark the location of the box and its opening on material such as drywall and the like which is positioned over the box opening and cover 10. With the drywall in position over cover 10 and the box, the drywall is struck and projections 40,42,44,46 indent the drywall and mark the cutout thereon to be made therein for the box opening. Accordingly, projections 40,42,44,46 serve as a tool or template to locate the box and its opening on the drywall.

Figure 11:
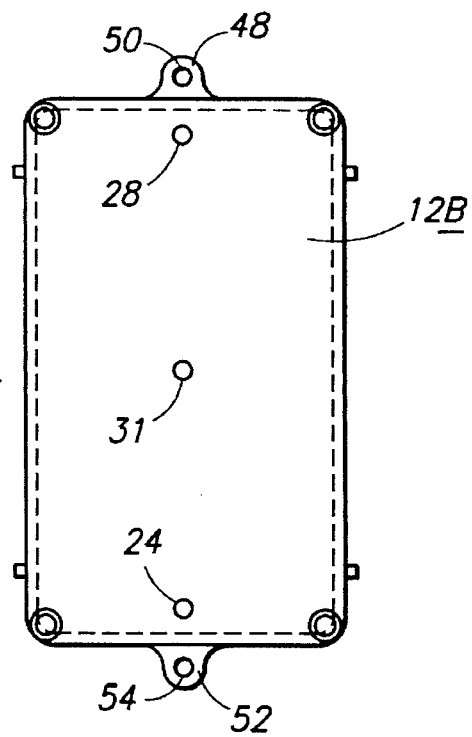
FIG. 11 is a bottom plan view of a second embodiment of the protective cover of the present invention.

FIG. 11 illustrates a second embodiment of the protective cover of the present invention. Single gang cover 47 includes additional means for securing it to the box and covering its opening. More specifically, an attaching extension 48 is positioned on the central axis of cover 47 and is integrally joined to and extends outwardly from outer surface 16B. Positioned centrally on extension 48, and aligned with holes 24,28,31 in base plate 12, is a hole 50 extending through extension 48 for receiving a fastener which engages a box hole (not shown). Another attaching extension 52 is also positioned on the central axis and is integrally joined to and extends outwardly from outer surface 14B. A hole 54 is positioned centrally on and extends through extension 52 and is aligned with holes 24,28,31 in base plate 12 and hole 50 in extension 48. Hole 54 is provided to receive another fastener for engagement with another box hole (not shown). Holes 24,28,31,50,54 are aligned on the central axis of cover 47. In all other respects, cover 47 is structurally identical to cover 10.

Figure 12:
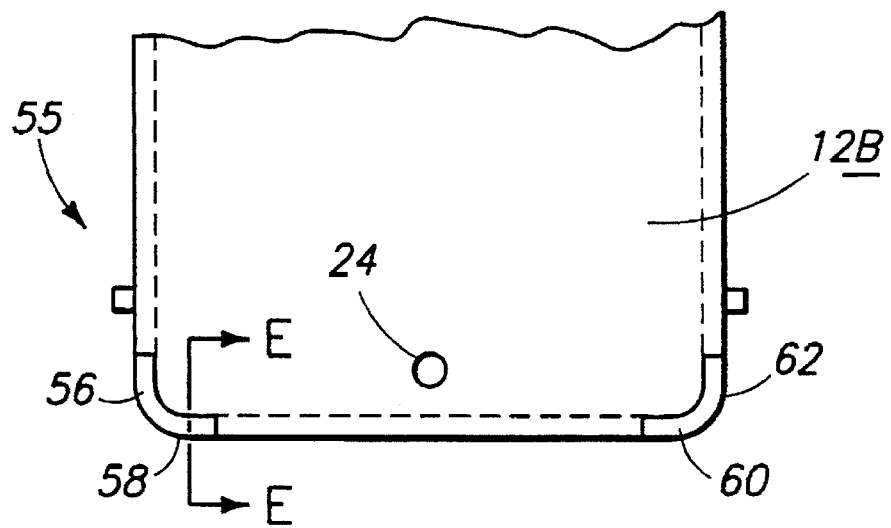
FIG. 12 is a partial bottom plan view of a third embodiment of the protective cover of the present invention.
Figure 13:
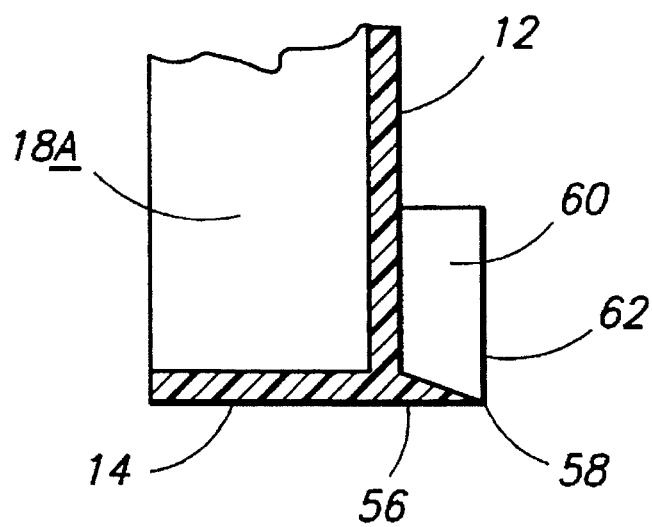
FIG. 13 is a cross-sectional view of the protective cover of the present invention taken along line E—E in FIG. 12.

A third embodiment of the protective cover of the present invention is depicted in FIGS. 12 and 13. Single gang cover 55 is provided with alternate projection means to indicate and mark the location of the box and its opening on drywall which is positioned over the box opening and cover 55. Projection means are positioned at each corner of outer surface 12B in the same manner as projections 40,42,44,46 of cover 10; only two of the four projection means of cover 55 are shown in FIG. 12. The projection means comprise L-shaped bosses 56 and 60 which extend around and outwardly from the corners of outer surface 12B and are provided with sharp outer edges 58 and 62, respectively. With the drywall in position over cover 55 and the box, the drywall is struck and the sharp edges 58 and 62 and the other sharp edges of the other two bosses (not shown) cut into the drywall thereby locating and marking the cutout to be made in the drywall. Alternatively, the projection means may be constructed as a unitary wall having a continuous sharp outer edge extending outwardly from and completely around the periphery of outer surface 12B to mark the entire profile of the box opening forming the cutout in the drywall. In all other respects, cover 55 is structurally identical to cover 10.

Covers 10,47,and 55 are universally dimensioned to fit all of the conventionally used and differently sized single gang outlet boxes. More particularly, single gang steel boxes vary in height from $2\frac{7}{8}$–$3\frac{7}{8}$" and in width from $1\frac{13}{16}$–2", while single gang plastic boxes vary in height from $2\frac{15}{16}$–$3\frac{9}{16}$" and in width from $2$–$2\frac{1}{16}$". Accordingly, due to the smaller variation in width dimensions of the boxes, legs 32,34,36,38 are positioned to frictionally contact the interior side walls of the boxes, since a maximum of only $\frac{3}{16}$" of flex is required for the legs to contact the side walls of all the boxes. Arranging the legs to contact the end walls of the boxes would not be either prudent or practical since a maximum of 1" of flex would be required, and plastic does not have that degree of resiliency, i.e. the legs would permanently deform and the likelihood of breakage would greatly increase. To assure a tight fit of the covers in all of the boxes and to insure that no deformation or breakage of the legs will occur, a maximum leg flex of $\frac{11}{16}$" has been determined. To accommodate all of the conventional boxes and maintain leg flexing within the determined limit, the lateral or widthwise spacing of legs 32,34,36,38 is critical. As shown in FIG. 4, dimension X has been determined to be $2\frac{3}{8}$" to permit a satisfactory frictional fit into the largest box ($2\frac{1}{16}$"), while dimension Y has been determined to be $1\frac{7}{8}$" to permit a satisfactory frictional fit into the smallest box ($1\frac{13}{16}$"), and thereby establish a flex range of $\frac{5}{32}$–$\frac{9}{16}$" for the legs which is within the determined maximum of $\frac{11}{16}$" noted above. Furthermore, the X and Y dimensions have been calculated to permit the legs to be inserted into all of the conventional boxes in the spaces between outlets and switches positioned centrally therein and the side walls of the boxes. Further, to accommodate all the peripheral dimensions of all the noted conventional boxes and to encase electrical elements contained in and extending from the boxes, base member 22 is provided with a width of 2¼" a length of 3¾", and a height of ⅝". The substantial height dimension of ⅝" also insures that drywall will not be installed over the cover since it causes a substantial outward bulge in the drywall which would be clearly visible to the drywaller during installation. Alternatively, each of the covers 10,47,55 may be universally dimensioned in accordance with the principles of this invention to individually accommodate each of the respective, conventionally-used multiple gang boxes, i.e. double, triple, quad, etc. Further, the covers may alternatively be configured in other common box shapes such as round, hexagonal, octagonal, etc. and universally dimensioned to fit all the boxes of each respective shape in accordance with the principles of this invention.

In use, any of the covers 10,47 or 55 are grasped on walls 14,16,18,20 of base members 22 in a manner wherein legs 32,34,36.38 are facing and aligned with a box opening. Upon the initial portion of the insertion of the cover into the box, the outwardly curved surfaces of first portions 1–2 of outer ends 32C,34C,36C,38C frictionally contact the interior side walls of the box causing the legs to smoothly enter the box and to begin flexing inwardly. Upon further insertion of the cover into the box, due to the resiliency of the legs, the outer ends are flexed inwardly further, and second portions 2–3 frictionally contact the box's side walls. If the cover being inserted is of the largest width dimension, further insertion of the cover will not effect any further inward flexing of the legs and the cover will be secured in the box by the frictional contact of second portions 2–3 upon full insertion of the cover into the box. However, if the cover being inserted is of the smallest width dimension, further insertion of the cover will effect further inward flexing of the legs to the extent that outer ends 32C,34C,36C,38C are substantially straightened and third portions 3–5 also frictionally contact the box's side walls to secure the cover in the box upon full insertion of the cover into the box. The slightly curved forward ends 3–4 of third portions 3–5 also facilitate the smooth entry of the outer ends during the further insertion portion of the entry of the cover into the box.

After the cover has been completely inserted into the box, fasteners may be inserted into holes 24,28,31 to add further securement of the covers to decorative rectangular outlets, receptacle face plates, or threaded box holes, and to provide a safety expedient to prevent young children from possibly removing a frictionally secured cover and being exposed to electrical shock. Further, holes 24,28 provide a means for using fasteners to mount the covers to mud rings as well as all of the boxes, while all of the holes 24,28,31 enable cover mounting even if one or more of the legs 32,34,36,38 are broken.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A protective cover for covering an opening, comprising:

a base member which is dimensioned for overlying said opening, for receiving and encasing elements therein which extend outwardly from said opening, and for preventing said opening from being covered by material subsequently positioned over said opening and said base member;

a plurality of projection means extending from said base member for indicating and marking a location of said opening on said material subsequently positioned over said opening and said base member; and, a plurality of retaining means extending from said base member, said plurality of retaining means being positioned and dimensioned to extend beyond said base member, wherein each of said plurality of retaining means includes a lower portion and an upper portion extending angularly upwardly and outwardly from said lower portion to an outer end which extends beyond said base member for enabling frictional engagement of said outer end of each of said plurality of retaining means with interior surfaces of said opening for securing said cover over said opening.

2. The protective cover of claim 1, wherein said cover is constructed in one piece and composed of polymeric material.

3. The protective cover of claim 1, further comprising;

a plurality of attaching means extending outwardly from said base member, each of said attaching means having an aperture extending therethrough for receiving a fastener therein for securing said cover over said opening.

4. The protective cover of claim 1, wherein said base member includes a base plate, and wall means extending from said base plate in a first direction, and wherein said projection means extends from said base plate in a second direction opposite to said first direction.

5. The protective cover of claim 4, wherein said wall means includes a pair of opposed end walls and a pair of opposed side walls, said end and side walls being joined at respective ends thereof.

6. The protective cover of claim 5, wherein said end and side walls are dimensioned to provide a substantially rectangular base member.

7. The protective cover of claim 4, wherein each of said plurality of projection means is a frusto-conical pin.

8. The protective cover of claim 4, wherein each of said plurality of projection means is L-shaped and has a sharp edge along one side thereof.

9. The protective cover of claim 1, wherein said outer end of each of said plurality of retaining means includes an outwardly curved first portion which is dimensioned and positioned for enabling smooth contact of said first portion of said retaining means with said interior surfaces upon initial insertion of said retaining means into said opening.

10. The protective cover of claim 9, wherein said outer end of each of said plurality of retaining means further includes a linear second portion positioned adjacent to said first portion for contacting said interior surfaces upon continued and further insertion of said retaining means into said opening.

11. The protective cover of claim 10, wherein said outer end of each of said plurality of retaining means further includes a substantially linear third portion positioned adjacent to said second portion for contacting said interior surfaces upon continued and still further insertion of said retaining means member into said opening.

12. The protective cover of claim 11, wherein each of said plurality of retaining means is a resilient leg member.

13. The protective cover of claim 1, further comprising;

a plurality of holes extending through said base member for receiving fasteners therein for securing said cover over said opening.

14. A protective cover for covering an opening in electrical outlet boxes, comprising:

a base plate;

a pair of opposed end walls extending from said base plate in a first direction;

a pair of opposed side walls extending from said base plate in said first direction;

wherein said end and side walls are joined at respective ends thereof to form, together with said base plate, a base member which is dimensioned for overlying said opening, for receiving and encasing therein elements extending outwardly from said opening, and for preventing said opening from being covered by material subsequently positioned over said opening;

a plurality of retaining means extending from said base plate in said first direction, said plurality of retaining means being positioned along said pair of opposed side walls and dimensioned to extend beyond said pair of opposed side walls for enabling frictional engagement of said plurality of retaining means with interior surfaces of said boxes for securing said cover over said opening; and a plurality of projection means extending from said base plate in a second direction opposite to said first direction for indicating and marking a location of said opening on said material subsequently positioned over said opening and said base member.

15. The protective cover of claim 14, wherein said plurality of retaining means includes a first pair of retaining means positioned in spaced relationship along one of said pair of side walls, and a second pair of retaining means positioned in spaced relationship along the other of said pair of side walls.

16. The protective cover of claim 15, wherein each of said plurality of retaining means is a resilient leg member.

17. The protective cover of claim 14, further comprising;

an attaching means extending outwardly from each of said opposed end walls, each of said attaching means having an aperture extending therethrough for receiving a fastener therein for securing said cover over said opening.

18. The protective cover of claim 14, wherein said cover is constructed in one piece and composed of polymeric material.

19. The protective cover of claim 14, further comprising;

a plurality of holes extending through said base plate for receiving fasteners therein for securing said cover over said opening.

20. A universal cover for covering openings in multi-sized electrical outlet boxes, comprising:

a base plate;

a pair of opposed end walls extending from said base plate in a first direction;

a pair of opposed side walls extending from said base plate in said first direction;

wherein said end and side walls are joined at respective ends thereof to form, together with said base plate, a base member which is universally dimensioned for overlying each of said openings for receiving and encasing therein elements extending outwardly from said openings, and for preventing said openings from being covered by material subsequently positioned over said openings;

a first pair of resilient legs extending from said base plate in said first direction and positioned in spaced relationship along one of said pair of side walls;

a second pair of resilient leg members extending from said base plate in said first direction and positioned in spaced relationship along the other of said pair of side walls;

wherein said resilient legs of said first and second pairs of resilient legs extend outwardly and laterally beyond said opposed side walls for enabling frictional engagement of said resilient legs with interior surfaces of said boxes to secure said cover over said openings; and a plurality of projection means extending from said base plate in a second direction opposite to said first direction for indicating and marking a location of said openings on said material subsequently positioned over said openings and said base member.

* * * * *